(12) United States Patent
Ueno

(10) Patent No.: US 7,185,958 B2
(45) Date of Patent: Mar. 6, 2007

(54) ELASTIC CRAWLER

(75) Inventor: Yoshio Ueno, Kishiwada (JP)

(73) Assignee: The Ohtsu Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 11/184,906

(22) Filed: Jul. 20, 2005

(65) Prior Publication Data
US 2005/0252697 A1 Nov. 17, 2005

Related U.S. Application Data

(62) Division of application No. 10/357,342, filed on Feb. 4, 2003, now Pat. No. 6,942,305.

(30) Foreign Application Priority Data
Feb. 27, 2002 (JP) ............................. 2002-052156

(51) Int. Cl.
B62D 55/24 (2006.01)
(52) U.S. Cl. ...................... 305/167; 305/178; 305/165
(58) Field of Classification Search .................. 305/46, 305/157, 160, 165, 167, 170–171, 177–179, 305/181, 185, 193, 195, 175
See application file for complete search history.

(56) References Cited

U.S. PATENT DOCUMENTS

| 6,000,766 | A | 12/1999 | Takeuchi et al. |
| 6,068,354 | A | 5/2000 | Akiyama et al. |
| 6,106,083 | A | 8/2000 | Ono |
| 6,170,925 | B1 | 1/2001 | Ono |
| 6,322,172 | B2 | 11/2001 | Lussier |
| 6,402,268 | B1 | 6/2002 | Lussier |
| 6,422,666 | B2 | 7/2002 | Choi |
| 6,474,756 | B2 | 11/2002 | Hori et al. |
| 6,568,769 | B1 | 5/2003 | Watanabe et al. |
| 6,652,044 | B1 * | 11/2003 | Katoh et al. ................. 305/165 |
| 6,742,852 | B2 | 6/2004 | Tsuru et al. |
| 6,746,090 | B2 | 6/2004 | St-Pierre |
| 6,942,305 | B2 * | 9/2005 | Ueno ........................... 305/167 |

FOREIGN PATENT DOCUMENTS

| JP | 54-129624 | * 10/1979 | ................. 305/177 |
| JP | 55-55063 | * 4/1980 | ................. 305/177 |
| JP | 55-55066 | * 4/1980 | ................. 305/177 |
| JP | 56-154369 | * 11/1981 | ................. 305/177 |
| JP | SHO 57-5384 | 1/1982 | |
| JP | SHO 5-096070 | 6/1984 | |
| JP | SHO 61-117077 | 7/1986 | |

(Continued)

Primary Examiner—Jason R. Bellinger
(74) Attorney, Agent, or Firm—Daniel S. Song; Nixon Peabody, LLP

(57) ABSTRACT

An elastic crawler having a crawler body formed of a rubber elastic material into an endless belt so that rollers rotatively move on right and left side regions on an inner surface of the crawler body is provided with a reinforcement provided extending outwardly in a thickness direction of the crawler body in an area of the crawler body extending at least partially under said right and left ends of each of the rollers. The prevents the elastically bendable side regions from being cracked when either of the side regions of the elastic crawler is bent about an axis that extends in a circumferential direction of the crawler.

4 Claims, 13 Drawing Sheets

FOREIGN PATENT DOCUMENTS

| | | |
|---|---|---|
| JP | HEI 03-67284 | 7/1991 |
| JP | HEI 08-113173 | 5/1996 |
| JP | HEI 08-192779 | 7/1996 |
| JP | HEI 11-171061 | 6/1999 |
| JP | 2000-302069 | 10/2000 |
| JP | 2002-029461 | 1/2002 |

* cited by examiner

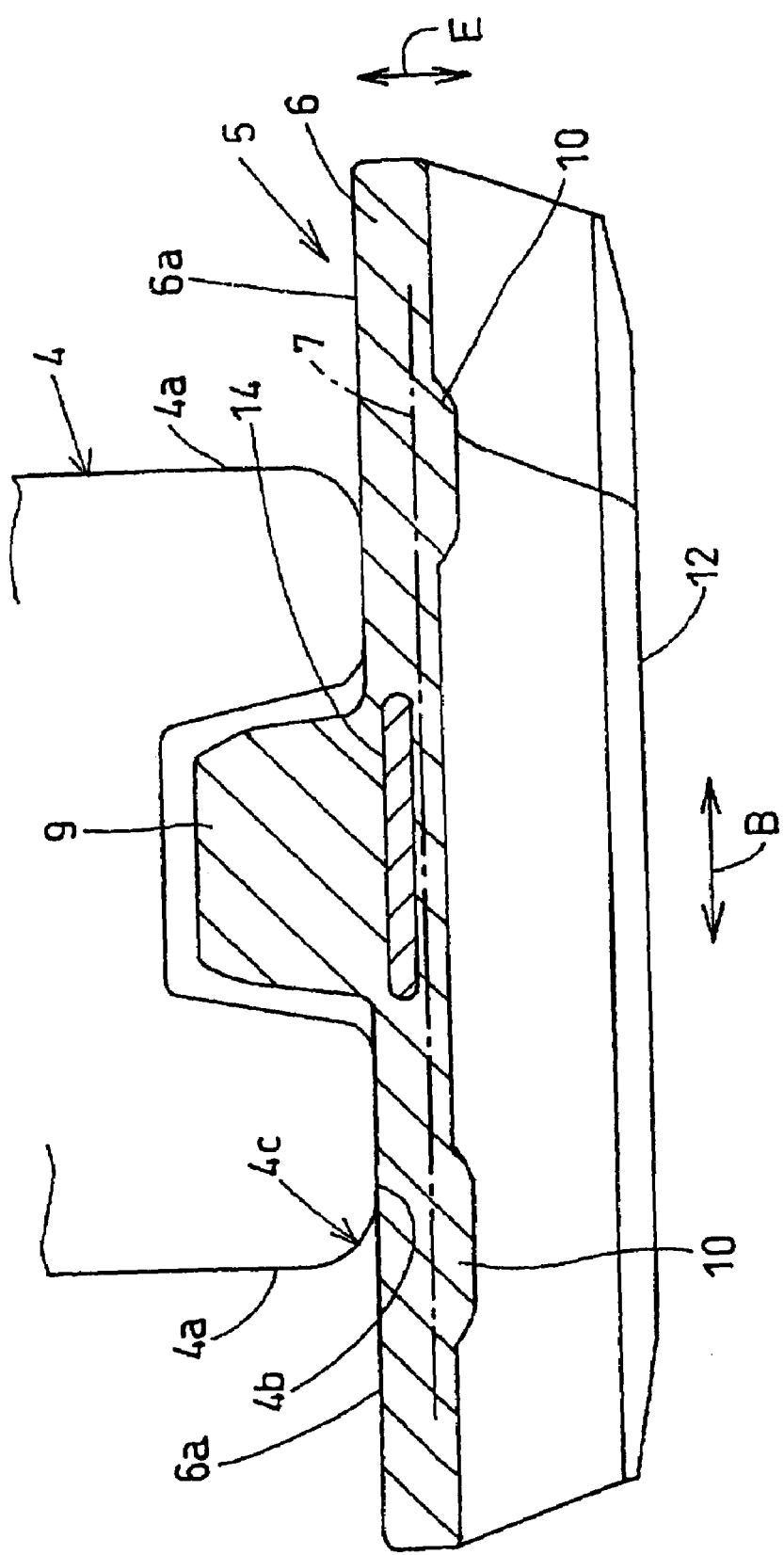

ELASTIC CRAWLER

CROSS-REFERENCE TO RELATED APPLICATION

This application is a division of U.S. patent application Ser. No. 10/357,342, filed Feb. 4, 2003, now issued as U.S. Pat. No. 6,942,305.

BACKGROUND OF THE INVENTION

1. Field of the Invention

This invention relates to an elastic crawler for use in a crawler-type traveling apparatus adopted for traveling part of an agricultural machine such as a half-tractor or a combine, a construction machine such as a back-hoe, or an automobile, and is employed, for example, as a core-metalless elastic crawler (called also rubber crawler free of core metal) in which a core metal is not buried within a crawler main body of the crawler.

2. Description of Related Art

A conventional crawler-type traveling apparatus adopted on a traveling part of agricultural or construction machine is structured, mainly, with an endless strip-formed crawler belt (covering belt) stretched over a driving wheel, an idler (follower wheel) and a plurality of rollers. By drivably rotating the driving wheel, the crawler belt is circulated along the circumferential direction, thereby enabling the machine to travel.

There exists, as the crawler belt, an elastic crawler having a crawler main body formed of a rubber-like elastic material into an endless belt and configured to convey drive power from the driving wheel through the driving projections provided in an inner surface of the crawler main body.

The elastic crawler has a core-metalless structure in which a core metal extending between the right and left ends of the crawler is not buried in the crawler main body.

Meanwhile, the crawler-type traveling apparatus adopting such a core-metalless elastic crawler employs outer-flanged type rollers rolling on right and left side regions in the inner surface of the crawler body. The crawler body is formed with right and left side regions having substantially uniform thickness (generally even thickness) entirely in the widthwise direction of the crawler.

As the size of the main body of the machine adopting the crawler-type traveling apparatus increases, the conventional elastic crawler also increases in its width in order to keep low ground contact pressure. This requires broadening the width of the roller, correspondingly. However, there is a limitation in broadening the width of the roller in view of increases in costs, weight, and so on.

In the case that the elastic crawler has such a broad width that its side regions largely extend out of the roller in the widthwise direction of the crawler, when the elastic crawler at the side region runs over a projection, a marginal stone or the like, as shown in FIG. 13, the crawler body 20 at its side region 20a is bent about a portion 23 of the crawler body 20 corresponding to the right and left ends of outer peripheral surface of the roller 21. As a result, the bent portion is stretched on a ground-contacting surface side (stress concentration takes place in that portion) and, hence, crack might occur if the bent portion is in contact with a sharp obstacle.

Further, increases in lug height tend to trigger further local elongations due to a twist (entanglement) of the lug. Besides, during running over, clamping or swivel at a construction site with riprap or sharp matters, the crawler possibly encounters stretch and cut damage.

SUMMARY OF THE INVENTION

In view of the foregoing circumstance, it is an object of the present invention to prevent an elastic crawler having an elastically bendable side region from being cracked when the side region of the elastic crawler is bent.

The present invention has taken the following technical means in order to solve the technical problem.

Namely, an elastic crawler of the invention having a crawler body formed of a rubber elastic material into an endless belt so that rollers rotatively move on right and left side regions in an inner surface of the crawler body is characterized in that the crawler body is provided with a reinforcement rising in a thickness direction of the crawler body in an area on an outer peripheral surface of the crawler body corresponding to right and left ends of the roller.

Another technical means is an elastic crawler having a crawler body formed of a rubber elastic material into an endless belt so that rollers rotatively move on right and left side regions in an inner surface of the crawler body and characterized in that the crawler body is provided with a reinforcement rising in a thickness direction of the crawler body in an area on the inner surface of the crawler body corresponding to right and left ends of the roller.

Another technical means is an elastic crawler having a crawler body formed of a rubber elastic material into an endless belt so that rollers rotatively move on right and left side regions in an inner surface of the crawler body and characterized in that the crawler body is provided with a reinforcement having flexibility and being buried therein for reinforcing a region of the crawler body corresponding to right and left ends of the roller.

Another technical means is an elastic crawler having a crawler body formed of a rubber elastic material into an endless belt so that rollers rotatively move on right and left side regions in an inner surface of the crawler body and characterized in that the side regions each have a thickness gradually decreasing from a portion corresponding to right and left ends of the roller toward right and left ends of the crawler body.

Another technical means is an elastic crawler having a crawler body formed of a rubber elastic material into an endless belt so that rollers rotatively move on right and left side regions in an inner surface of the crawler body and characterized in that the side regions are each upwardly slanted from a portion corresponding to right and left ends of the roller toward right and left ends of the crawler body.

Another technical means is an elastic crawler having a crawler body formed of a rubber elastic material into an endless belt so that rollers rotatively move on right and left side regions in an inner surface of the crawler body and characterized in that the crawler body has on an outer peripheral surface thereof a lug having right and left ends arranged on positions outer than right and left ends of the roller, respectively, with respect to a lateral direction of the crawler body.

Another technical means is an elastic crawler having a crawler body formed of a rubber elastic material into an endless belt so that rollers rotatively move on right and left side regions in an inner surface of the crawler body and characterized in that the side regions each have a greater thickness in a region from a portion corresponding to right and left ends of the roller to right and left ends of the crawler body than in a central region of the crawler body with respect to a lateral direction of the crawler body.

Further objects, features and effects of the invention would be fully understood by the following description.

BRIEF DESCRIPTION OF THE DRAWINGS

FIG. 8 shows a fifth embodiment wherein

FIG. 11 is a sectional view in a widthwise direction of an elastic crawler according to a modification;

DETAILED DESCRIPTION OF THE INVENTION

Embodiments of the present invention will now be explained with reference to the drawings.

Figure 1:
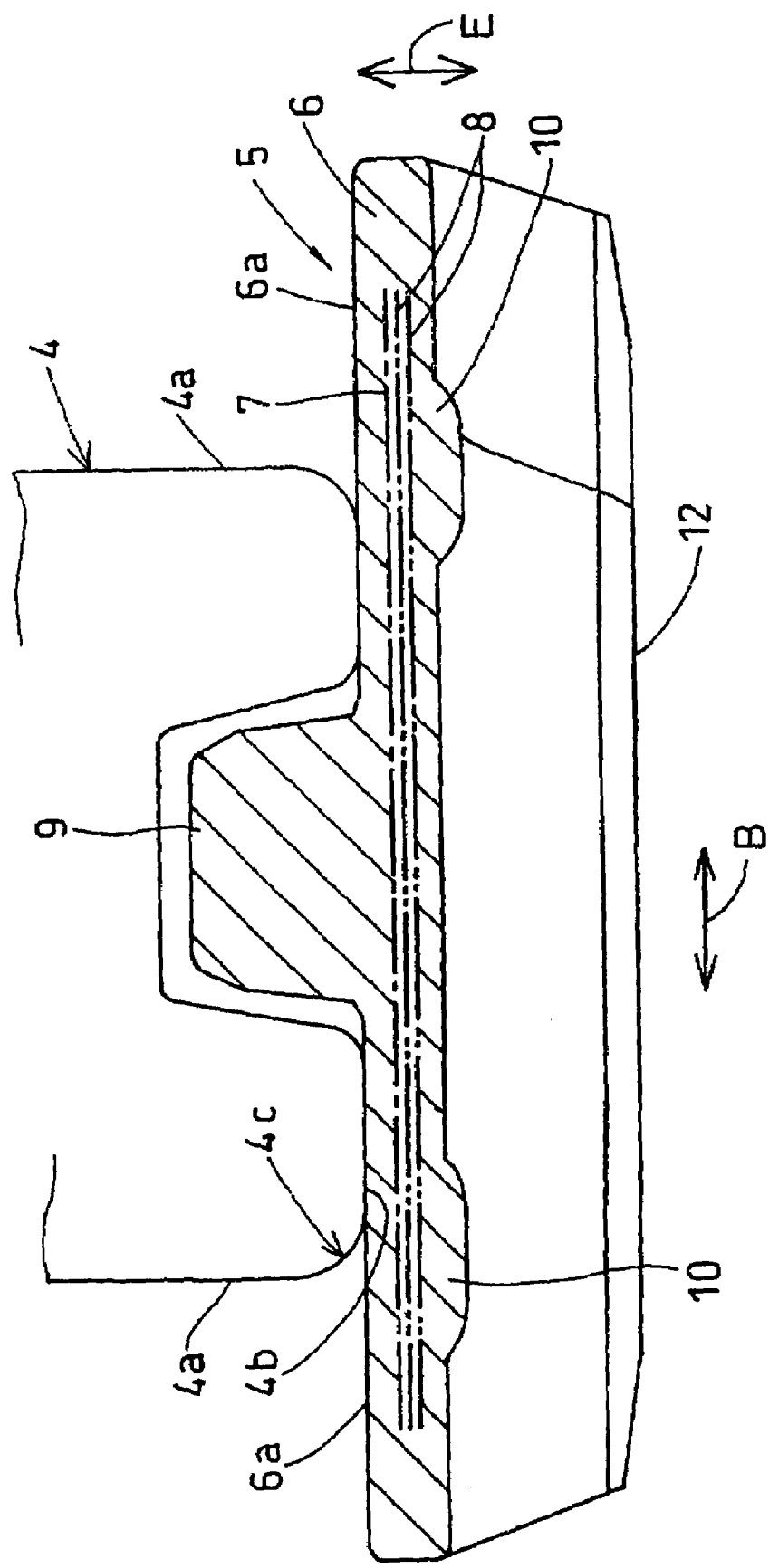
FIG. 1 is a sectional view in a widthwise direction of an elastic crawler according to a first embodiment.
Figure 2:
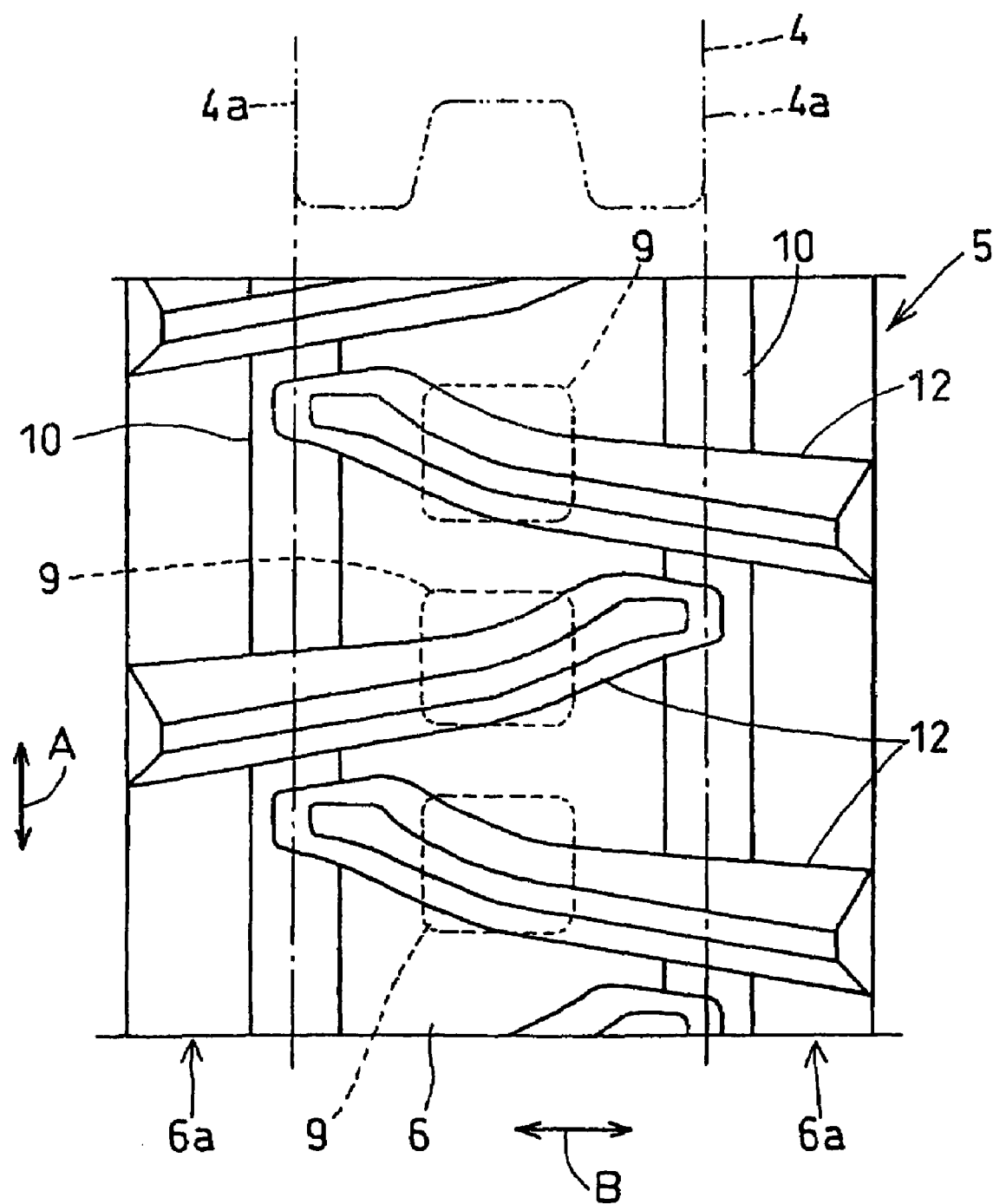
FIG. 2 is a view of the elastic crawler in the first embodiment as viewed on an outer periphery.
Figure 3:
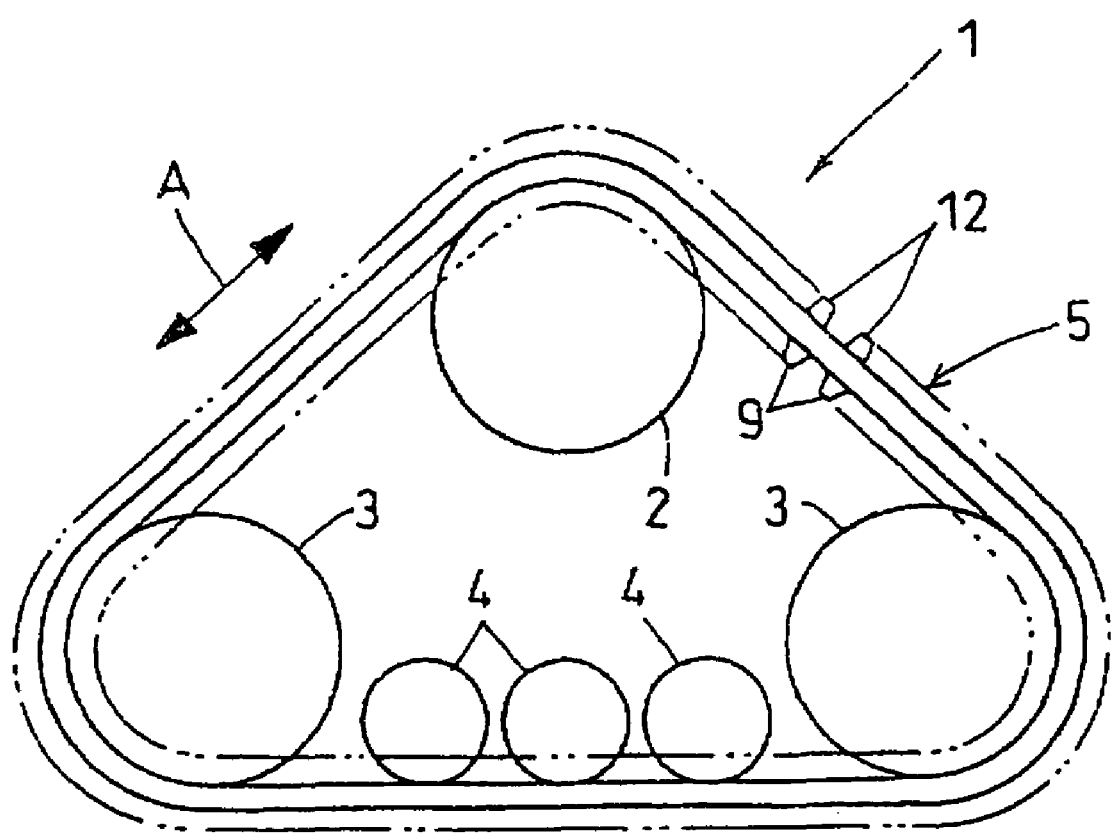
FIG. 3 is a side view of a crawler-type traveling apparatus.

FIGS. 1 to 3 show a first embodiment. In FIG. 3, the reference numeral 1 refers a crawler-type traveling device. The crawler-type traveling device 1 is basically structured with an elastic crawler 5 wrapped around a sprocket 2 (driving wheel), a pair of idlers 3 in the front and rear, and a plurality of rollers 4 and configured to travel by rotating the sprocket 2 so as to circulate (drive) the elastic crawler 5 in a circumferential direction A.

The elastic crawler 5 has a crawler body 6 formed of a rubber-like elastic material into an endless belt, as shown in FIGS. 1 and 2. In the crawler body 6, a tension member 7 and a plurality of layers of bias cords 8 are buried along the circumferential direction A of the crawler body 6.

The elastic crawler 5 has driving projections 9 of a rubber-like elastic material that are provided in a central region with respect to the lateral direction B of the crawler body 6 (in a width direction of the crawler) at intervals over the entire periphery in the crawler circumferential direction A. The driving projections 9 are configured to convey drive force from the sprocket 2 therethrough. This elastic crawler 5 does not include a core metal extending between right and left ends of the crawler 5 to be buried within the crawler body 6.

It should be noted that reinforcing members made of hard-resin or metal may be buried within the drive projections 9.

The crawler body 6 is provided on its outer periphery (on a ground-contact side) with lugs 12 of a rubber-like elastic material at intervals in the crawler circumferential direction A.

The tension member 7 consists of tensile-resisting cords, such as steel cords, extended along the crawler circumferential direction A and juxtaposed in the lateral direction B. The bias cords 8 consists of tensile-resisting cords, such as steel cords, juxtaposed (arranged in parallel) to each other and inclined with respect to the crawler circumferential direction A. According to this embodiment, the bias cords 8 are provided in two layers on an outer side of the tension member 7.

The sprocket 2 has a pair of disc-formed guides oppositely arranged in lateral direction B. Between the right and left guides, engaging teeth for engagement (meshing) with the driving projection 9 are arranged at intervals along a radially circumferencial direction of the sprocket, so that the right and left guides are connected through the engaging teeth.

Incidentally, respective outer peripheries of the guides are positioned on the right and left sides of the driving projection 9 so as to engage with the side surfaces of the driving projection 9, thereby preventing the crawler body 6 from deviating sideways.

Meanwhile, corners 4c of the roller 4 between the right and left side surfaces 4a and the outer peripheral surface 4b are rounded.

The elastic crawler 5 is provided with raised portions 10 (reinforcements) in the right and left side regions 6a on the outer periphery of the crawler body 6, which rise in a crawler thickness direction E.

The raised portion 10 is provided on the outer peripheral surface of the crawler body 6 in areas corresponding to the right and left ends 4a of the roller 4 (hereinafter, merely referred to as roller ends 4a) (in areas beneath the roller ends 4a and/or the vicinity thereof), thus providing the crawler body 6 with greater rigidity in the regions corresponding to the roller ends 4a than that of the other region.

When the side region of the elastic crawler 5 runs over a projection or the like, it is bent at a laterally outward position of the raised portion 10 (at a position laterally outer than the region beneath the right and left ends 4a of the roller 4). Thus, the stress caused by such bending on the elastic crawler 5 is dispersed (released from stress concentration) by means of the raised portion 10 to prevent crack occurrence in the elastic crawler 5.

Namely, in the invention, when the elastic crawler 5 is bent at its side region, the raised portion 10 laterally outwardly deviates the elongation (stress) concentrated in the region corresponding to the roller end 4a. Thus, the concentrated elongation is relaxed.

In this embodiment, the roller ends 4a are each substantially positioned at a center of each of the raised portions 10 with respect to the lateral direction B.

The lugs 12 are arranged so that a lug 12 extending from an intermediate point close to one side region 6a of the crawler body 6 to the end of the other side region 6a, and a lug 12 extending from an intermediate point of the crawler body 6 close to the other side region 6a to the end of the one side region 6a are arranged alternately in a crawler circumferential direction A. Further, the lugs 12 are each arranged so that one end portion thereof with respect to the lateral direction B terminates within an area where one raised portion 10 is projected, while the other end portion thereof intersects with the area where the other raised portion 10 is projected.

Although the raised portions 10, usually, are integrally formed with the crawler body 6 during forming the elastic crawler 5, they may be formed separately from the crawler body 6 and fixed thereon by an adhesive or the like.

Figure 4:
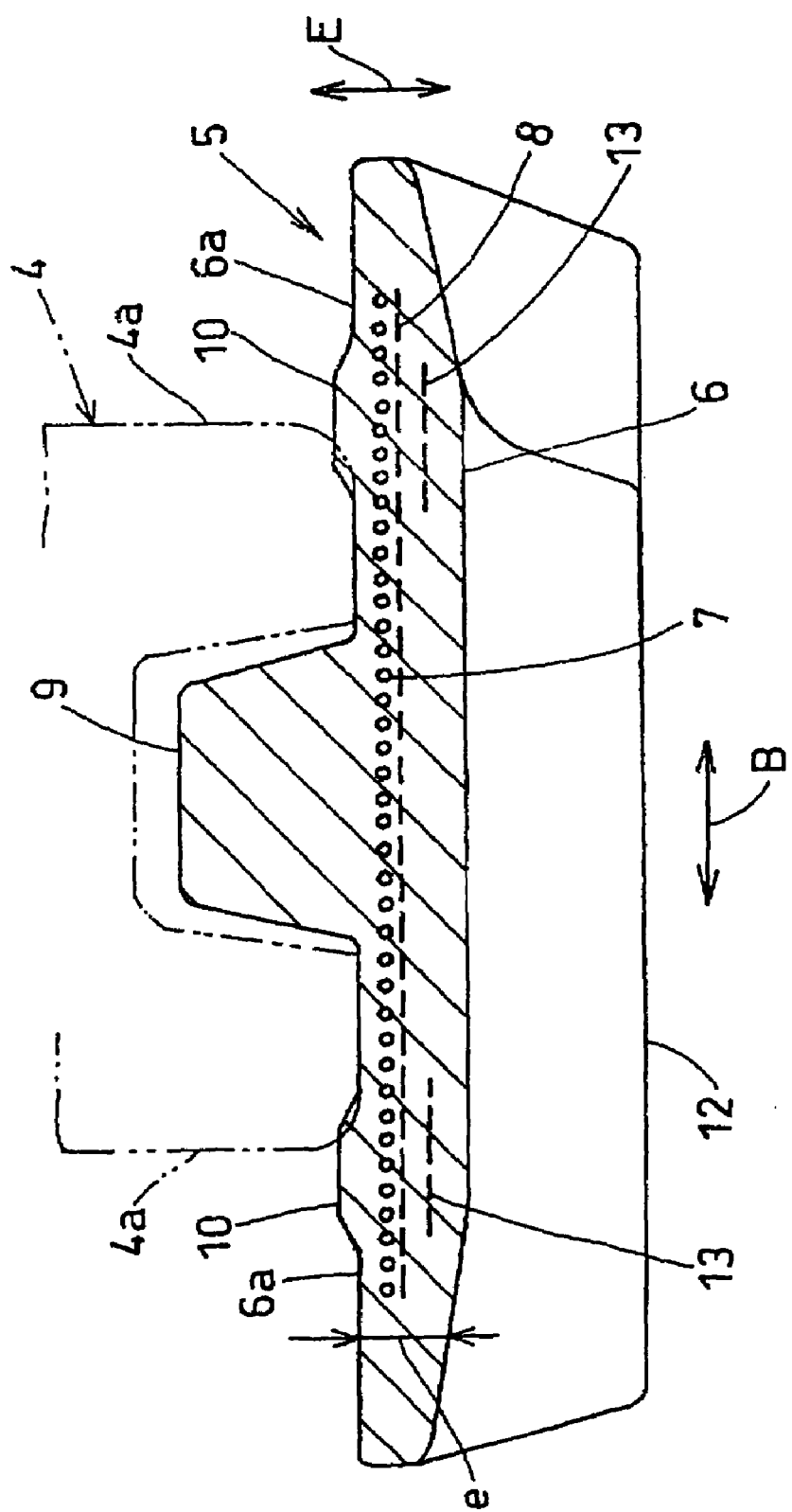
FIG. 4 is a sectional view in a widthwise direction of an elastic crawler according to a second embodiment.
Figure 5:
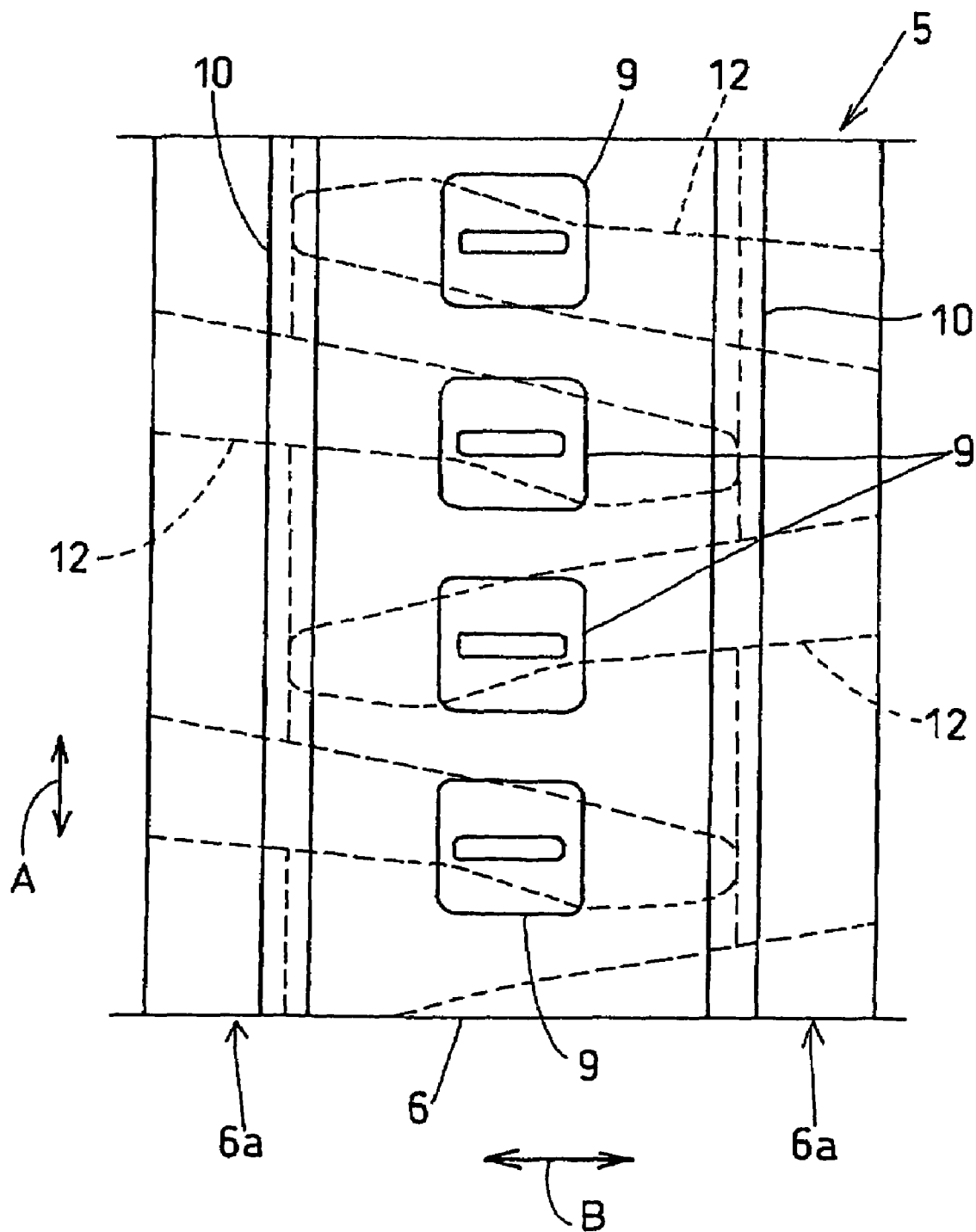
FIG. 5 is a view of the elastic crawler in the second embodiment as viewed on an outer periphery.

FIGS. 4 and 5 show a second embodiment. According to this embodiment, raised portions 10 (reinforcements) rising in the crawler thickness direction E are provided in the inner surface of the crawler body 6 in areas corresponding to the roller ends 4a, and flexible reinforcing layers 13 (reinforcements) are buried within the crawler body 6 for reinforcing the regions of the crawler body 6 corresponding to the roller ends 4a.

Each of the side region 6a of the crawler body 6 has an outer peripheral surface inwardly slanted from a portion corresponding to the roller end 4a toward the lateral end of the crawler body 6, i.e., the side regions 6a are each formed in a manner gradually reducing in thickness e toward the lateral end of the crawler body 6 with respect to the lateral direction B.

The other structures are substantially the same as the embodiment 1.

The reinforcing layer 13 is formed, for example, of tensile-strength cords such as steel cords, fibers, a rubber having a hardness higher than the rubber forming the crawler body 6, or a rubber less stretchable than the rubber forming the crawler body 6 and, hence, has flexibility.

According to the second embodiment, the raised portions 10, the reinforcing layers 13, or the side region 6a of the crawler body 6 having a thickness e gradually decreasing toward the lateral end of the crawler body 6 with respect to the lateral direction B provides the similar effect to the embodiment 1.

Accordingly, there is no need to provide all of the above structures on one elastic crawler 5, that is, they may be separately provided.

Figure 6:
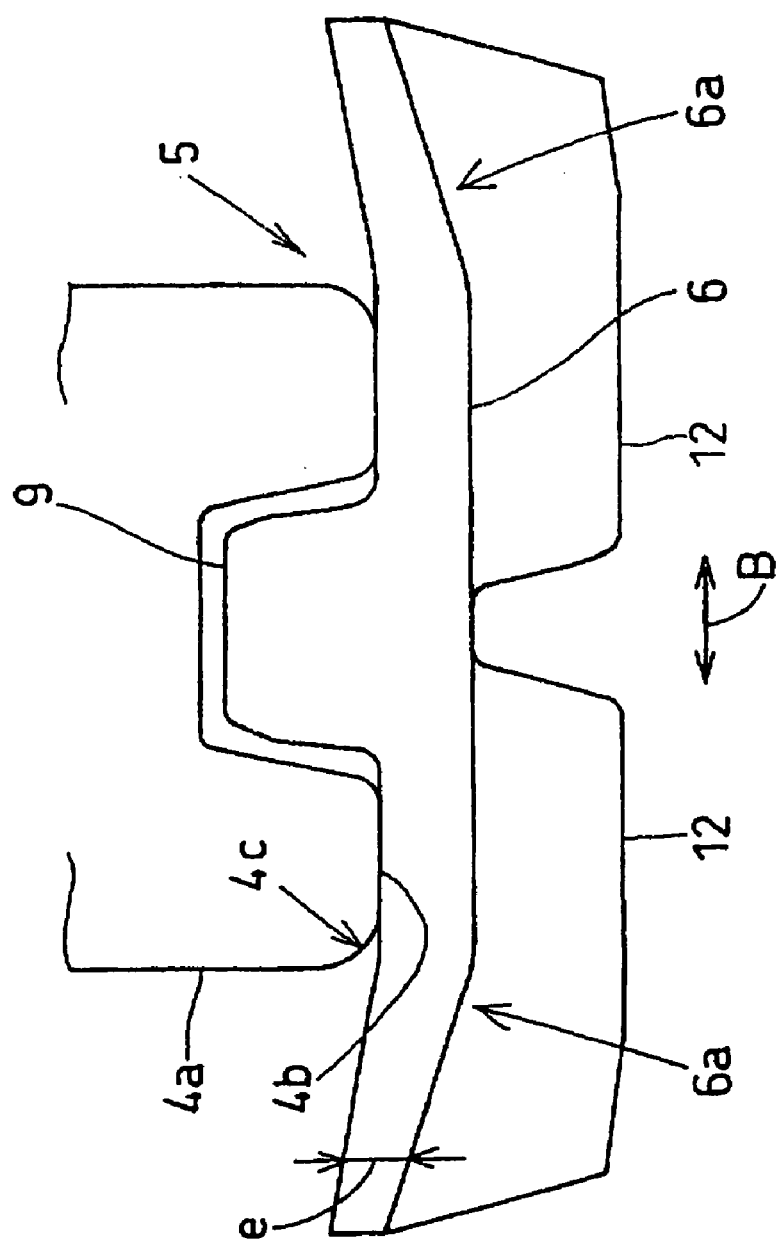
FIG. 6 is a sectional view in a widthwise direction of an elastic crawler according to a third embodiment.

FIG. 6 shows a third embodiment. According to this embodiment, the side regions 6a of the crawler body 6 are each upwardly slanted from a portion corresponding to the roller end 4a toward the lateral end of the crawler body 6 with respect to the lateral direction B. Further, the side region 6a has a thickness e gradually decreasing from the portion corresponding to the roller end 4a toward the lateral end of the crawler body 6 with respect to the lateral direction B.

The other structures are substantially the same as the embodiment 1.

This embodiment also provides the similar effect to the embodiment 1, owing to the above structure.

In this embodiment, the side regions 6a of the crawler body 6 are each formed in a form upwardly slanted and having a thickness e gradually decreasing toward the lateral end of the crawler body 6 with respect to the lateral direction B. However, it is not necessary that both of the above features are provided in one elastic crawler 5, that is, the side regions 6a of the crawler body 6 may be formed to upwardly slanted toward the lateral ends of the crawler body 6 with respect to the lateral direction B or formed to have a thickness e gradually decreasing toward the lateral ends of the crawler body 6 with respect to the lateral direction B.

Figure 7:
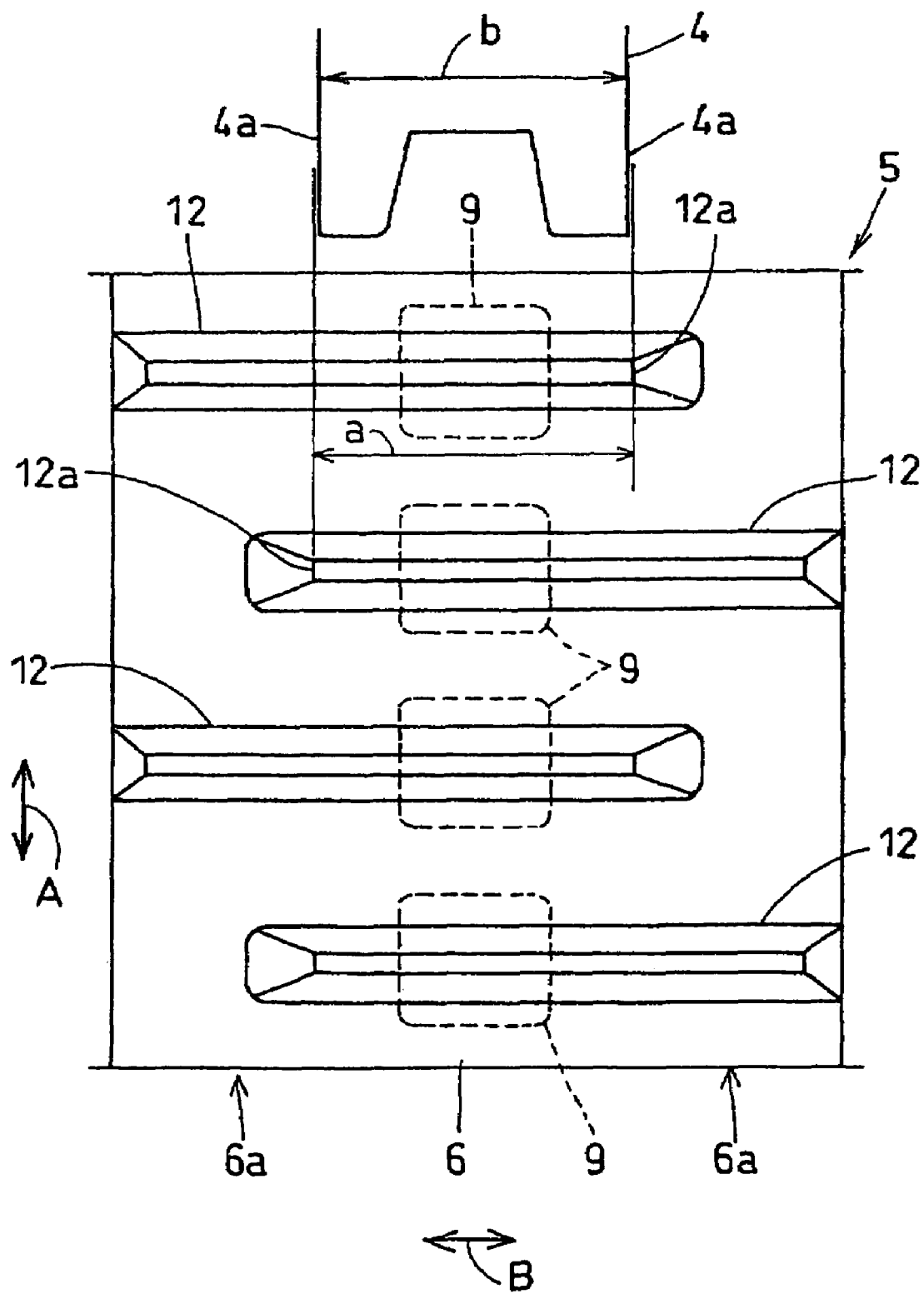
FIG. 7 is a view of an elastic crawler according to a fourth embodiment as viewed on an outer periphery.

FIG. 7 shows a fourth embodiment. According to this embodiment, the lug 12 provided in the outer peripheral surface of the crawler body 6 has a summit (ground-contacting surface) having a lateral ends 12a each arranged on a position which is intermediate of the side region 6a and outer than the roller end 4a with respect to the lateral direction B, that is, the width of the roller 4 b is smaller than the distance a between the lateral ends 12a of the summits of the adjacent lugs 12 with respect to the lateral direction B. The other structures are substantially the same as the embodiment 1.

This embodiment also provides the similar effect to embodiment 1.

Figure 8A:
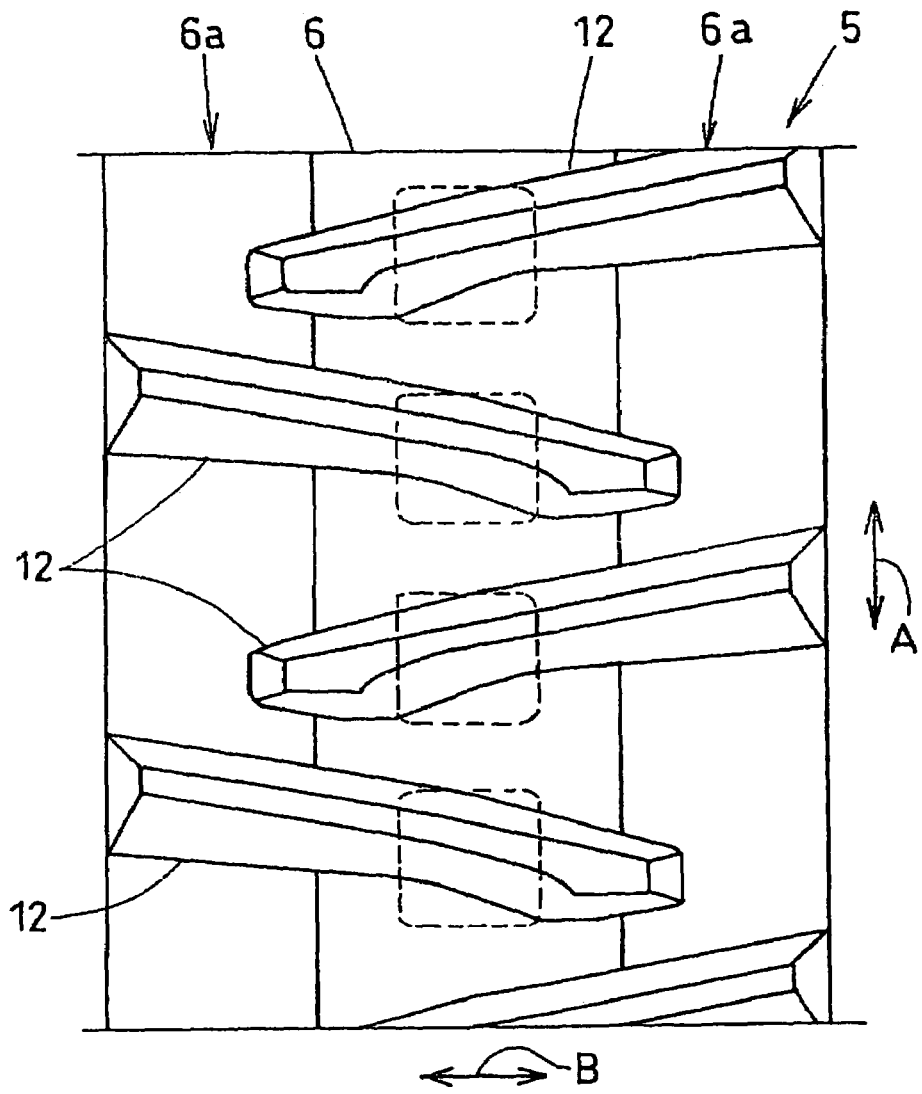
FIG. 8A is a view of an elastic crawler as viewed on an outer periphery and FIG. 8B is a sectional view in a widthwise direction of the elastic crawler.
Figure 8B:
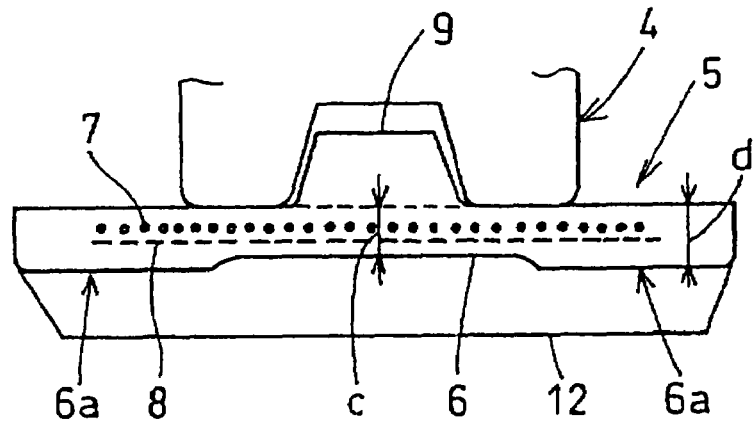

FIG. 8 shows a fifth embodiment.

In this embodiment, the crawler body 6 is formed with side regions 6a each having a greater thickness d in a region from the portion corresponding to the roller end 4a to the lateral end of the crawler body than a thickness c in a laterally central region of the crawler body 6, thereby obtaining the similar effect to the foregoing embodiments. The other structures are substantially the same as the foregoing embodiments.

Figure 9:
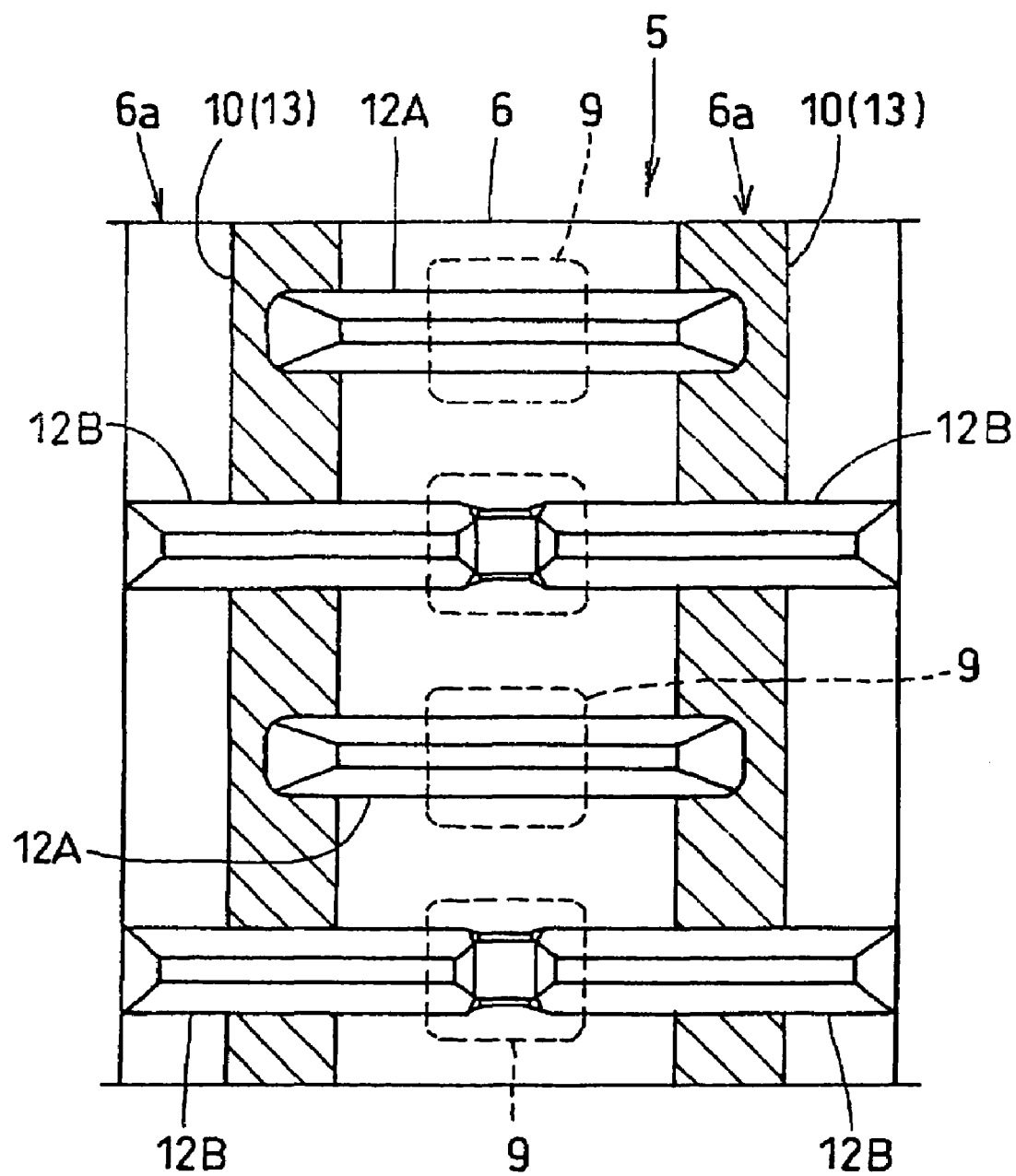
FIG. 9 is a view of an elastic crawler according to a modification as viewed on an outer periphery.
Figure 10:
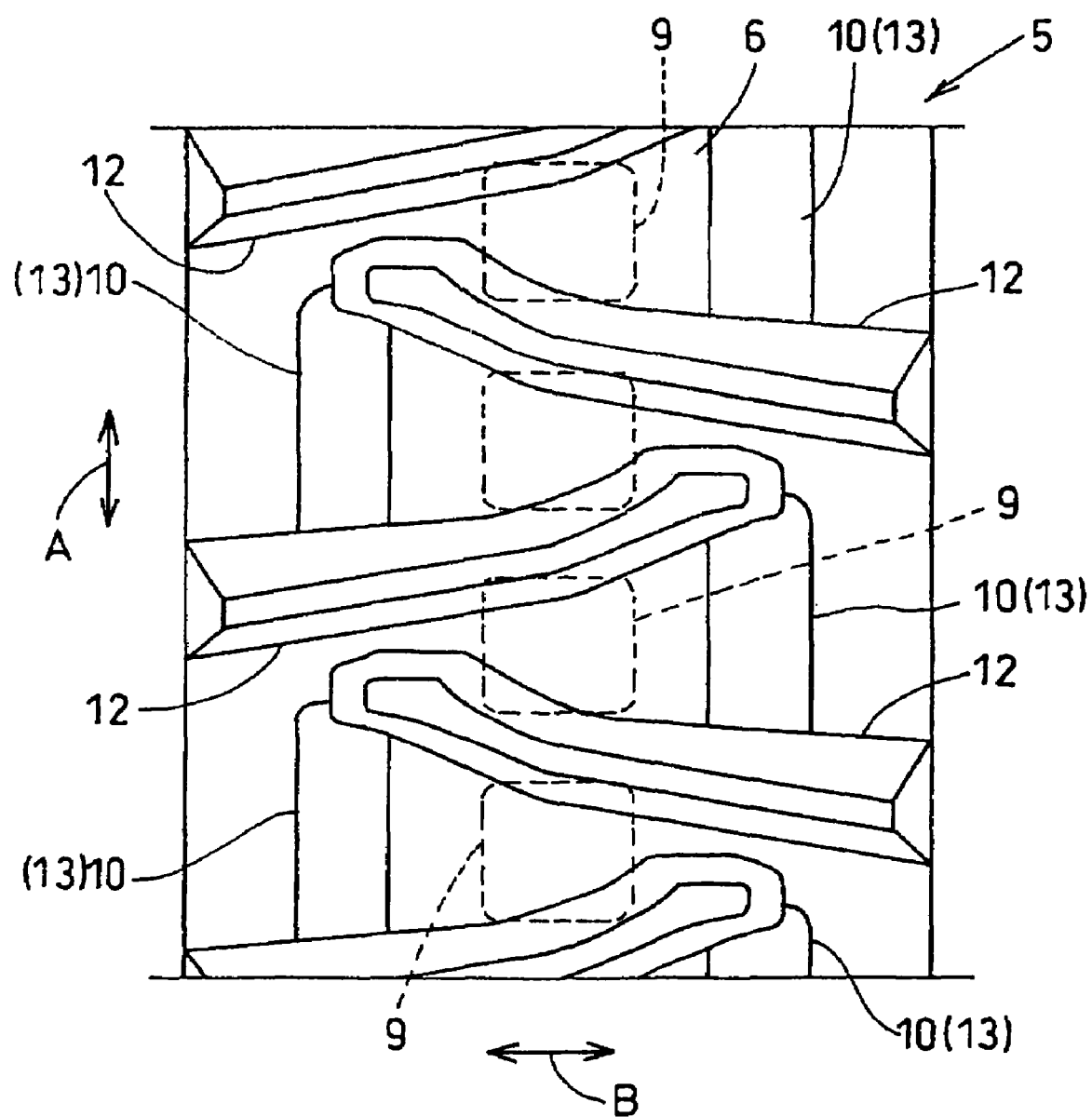
FIG. 10 is a view of an elastic crawler according to a modification as viewed on an outer periphery.

FIG. 9 shows a modification in which there are arranged, alternately in the crawler circumferential direction A, a lug 12A having lateral opposite ends intermediately positioned in the side regions 6a, respectively, with respect to the lateral direction B, and a pair of lugs 12B each having lateral one end positioned on a lateral center of the crawler body 6 and the other lateral end positioned on the lateral end of the crawler body 6 (or a lug extending from one end to the other end of the crawler body 6 with respect to the lateral direction B). In this modification, the lateral ends of the lug 12A are positioned in the projection areas of the reinforcements (raised portions 10 or reinforcing layers 13), respectively, while the lug 12B is arranged to transverse the projection areas of the reinforcements (raised portions 10 or reinforcing layers 13). FIG. 10 shows a modification in which the reinforcements (raised portions 10 or reinforcing layers 13) are discontinuously provided with respect to the crawler circumferential direction A. The other structures are substantially the same as the foregoing embodiments.

The elastic crawler 5 or the crawler-type traveling device 1 is a mere showing of examples, and the invention is not limited to the structures of the embodiments.

For example, as shown in FIG. 11, the elastic crawler 5 may have a core metal 14 which extends in the lateral direction so as not to reach the side regions 6a of the crawler body 6. This is to be adopted for an elastic crawler 5 having a crawler body 6 having elastically bendable side regions 6a.

Figure 12A:
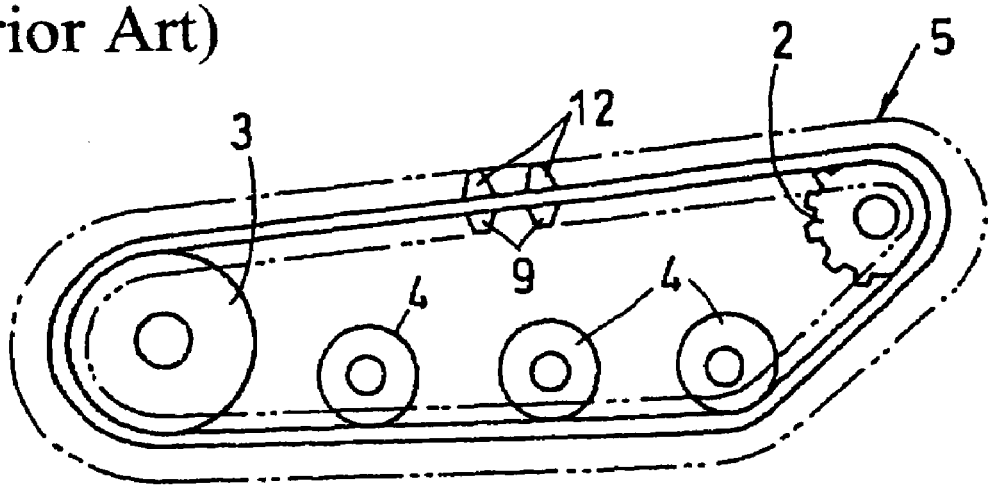
FIG. 12 is a side view of a crawler-type traveling apparatus of another kind.
Figure 12B:
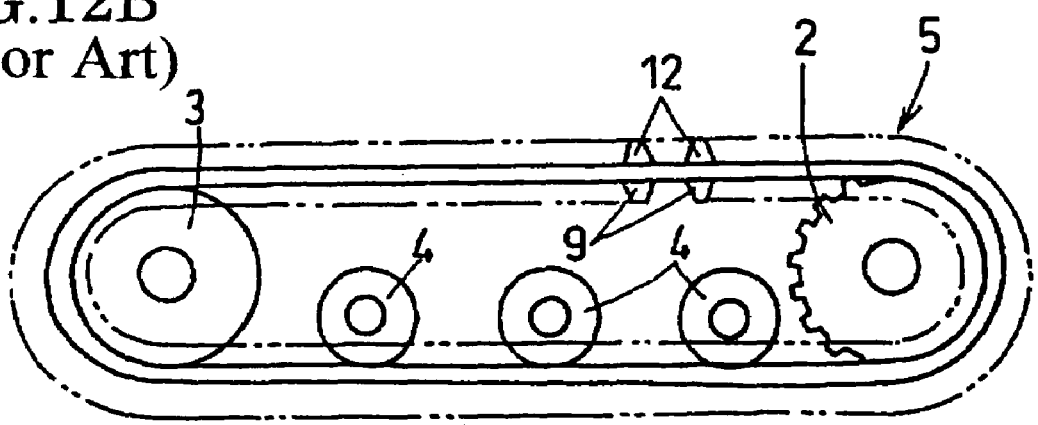
Figure 12C:
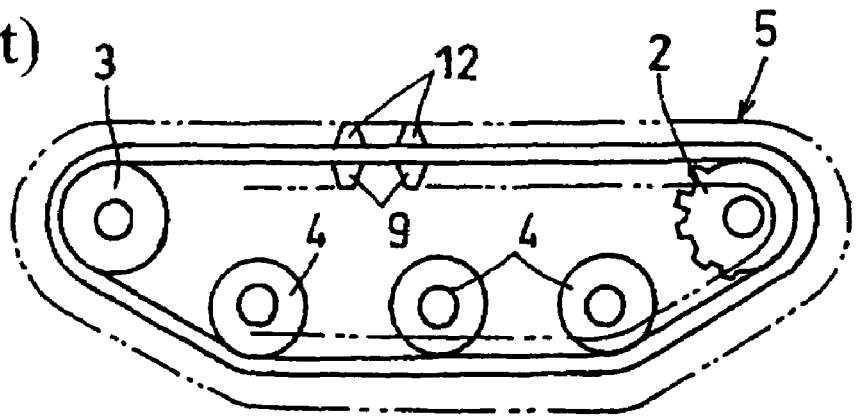
Figure 13:
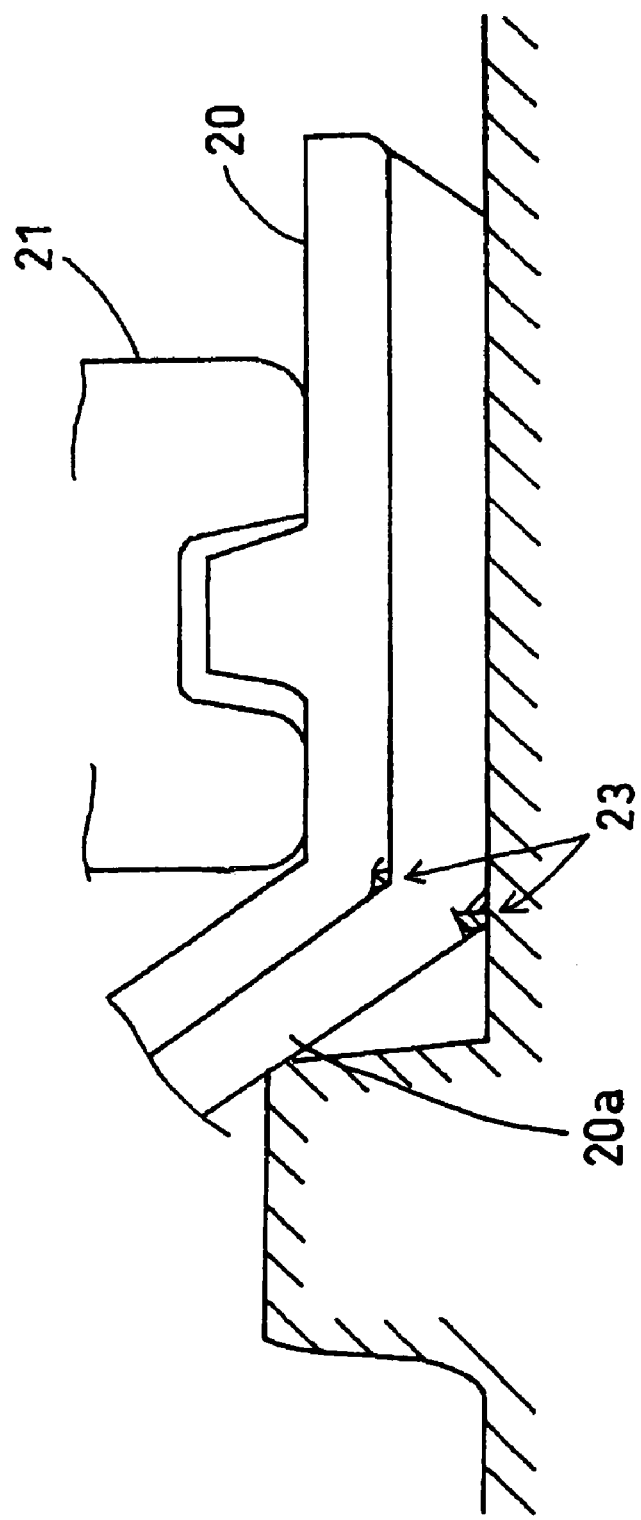
FIG. 13 is a sectional view of a conventional crawler-type traveling apparatus.

Meanwhile, the crawler-type traveling device 1 may have, for example, a structure as shown in FIG. 12 in which a crawler-type traveling device 1 is configured to convey a drive force by inserting the teeth of a sprocket 2 in the engagement holes formed in an elastic crawler 5.

As can be seen in the detailed embodiments, according to the present invention, when the elastic crawler at its side region runs over a projections or the like, the side region of the elastic crawler is bent at a portion laterally outside of the portion corresponding to the right or left ends of the roller. Accordingly, the stress caused on the elastic crawler by the bending is dispersed (released from stress concentration) thereby preventing crack occurrence.

It should be noted that the present invention is not limited to the foregoing embodiments but can be appropriately modified within the scope of the claims.

What is claimed is:

1. An elastic crawler comprising a crawler body formed of a rubber elastic material in an endless belt so that each of a series of rollers rotatively move on right and left elastically bendable side regions of an inner surface of the crawler body, said elastically bendable side regions extending outward beyond right and left ends of the rollers in a direction toward a respective circumferential edge of the crawler body and being elastically bendable about an axis that extends in a circumferential direction of the crawler, wherein:

for preventing the elastically bendable side regions from being cracked when either of the side regions of the elastic crawler is bent about said axis that extends in a circumferential direction of the crawler, a reinforcement is provided extending outwardly in a thickness direction of the crawler body in an area of the crawler body extending at least partially under said right and left ends of each of the rollers, said reinforcement being provided on the inner surface of the crawler body, and continuously formed in the circumferential direction of the crawler body.

2. An elastic crawler according to claim 1, further including a flexible reinforcement layer that is buried within the crawler body.

3. An elastic crawler according to claim 1, wherein said reinforcement comprises each of the side regions of the crawler body having a thickness that gradually decreases from a portion corresponding to right and left ends of the roller toward right and left ends of the crawler body with respect to a lateral direction of the crawler.

4. An elastic crawler according to claim 1, wherein the crawler body has a lug on an outer peripheral surface thereof, said lug having a summit with lateral ends, each of which is arranged on a position outward of right and left ends of the roller with respect to a lateral direction of the crawler.

* * * * *